(No Model.)
O. KROPFF.
Apparatus for Freeing Water from Atmospheric Air.
No. 230,025.  Patented July 13, 1880.
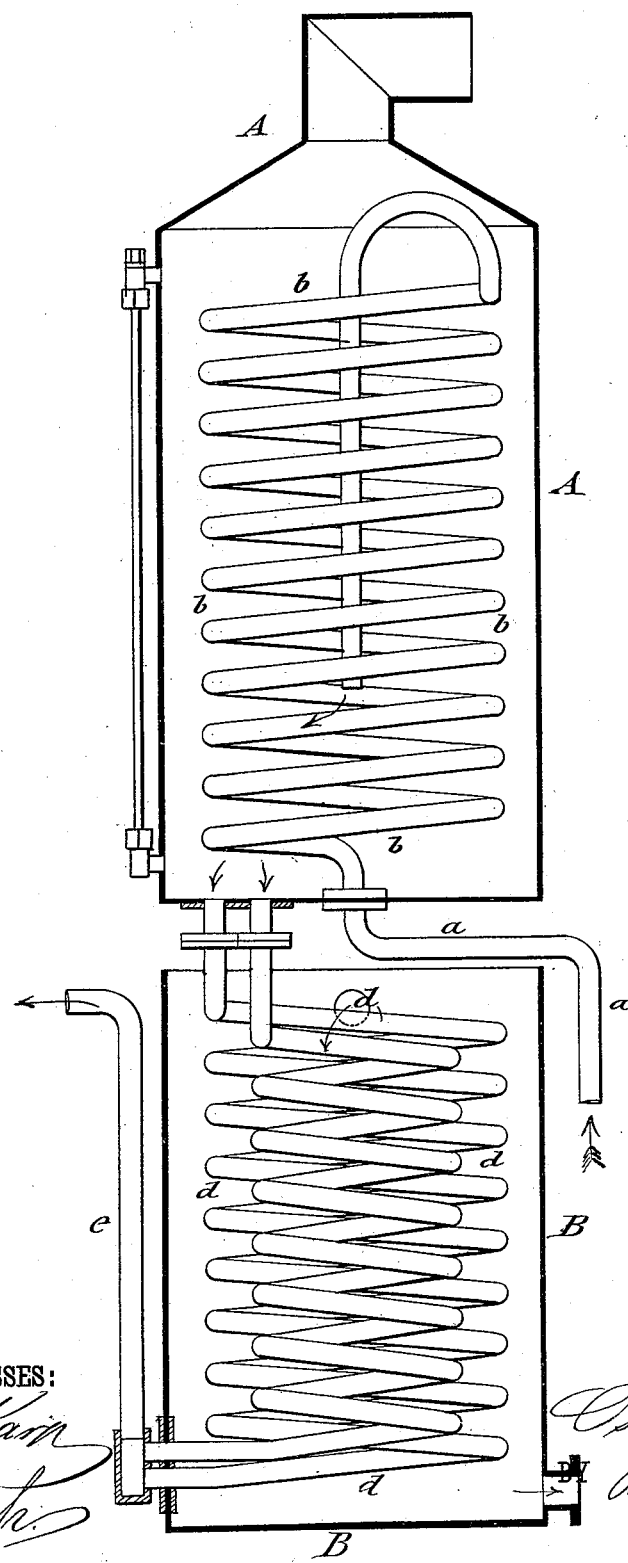

UNITED STATES PATENT OFFICE.

OSCAR KROPFF, OF NORDHAUSEN, GERMANY.

APPARATUS FOR FREEING WATER FROM ATMOSPHERIC AIR.

SPECIFICATION forming part of Letters Patent No. 230,025, dated July 13, 1880.

Application filed May 15, 1880. (No model.) Patented in Germany April 13, 1879.

*To all whom it may concern:*

Be it known that I, OSCAR KROPFF, of Nordhausen, in the Empire of Germany, have invented certain new and useful Improvements in Apparatus for Freeing Water from Atmospheric Air, of which the following is a specification.

The object of this invention is to furnish for use, in connection with ice-machines, an improved apparatus by which the water is freed from air prior to being exposed to freezing in the cans, for the purpose of obtaining a perfectly clear transparent ice having no milky appearance. As the water is exposed to freezing in closed cans, the air contained therein cannot escape, but freezes therewith, imparting a milky non-transparent appearance to the ice.

The non-transparent ice is objectionable, as it does not command such a ready sale as perfectly clear ice, which is as transparent as natural ice.

My improved apparatus accomplishes this in a simple manner; and it consists in an upper vessel, into which the water of condensation from the engine, or previously boiled water, is introduced through a coil, it being then conducted by one or more coils through a lower cooling-vessel without being brought in contact with air, and thence to the refrigerating-cans of the ice-machine.

The accompanying drawing represents a vertical central section of my improved apparatus for freeing water from air.

A in the same represents the upper, and B the lower vessel, of my apparatus.

To the upper vessel is conducted, by a supply-pipe, *a*, the water of condensation from the engine, or common boiling water. The pipe *a* passes through the bottom of the vessel and communicates with a coil, *b*, at the interior of the same. The water is discharged into the vessel through the bent upper end of the coil, so as to gradually fill the vessel A.

The vessel A has a tapering top portion with a small orifice, through which any steam may escape. A gage indicates the quantity of water contained in the vessel A. The coil *b* keeps the water in the upper vessel always in a hot or boiling condition, so as to expel the air contained therein and prevent the atmospheric air from entering and being absorbed by the water.

The body of hot water, which is freed of air, is conducted from the upper vessel, A, through one or more openings in the bottom of the same, to connecting-coils *d* in the lower vessel, B.

The water is cooled in the lower open vessel by cold water, which is supplied through an opening near the top and run off through a pipe near the bottom. The cooled-off water is finally conducted through a pipe, *c*, to the place of use, where it congeals into ice of perfect clearness and transparency, owing to the fact that all the air-bubbles are expelled, and that no air can get to the water in its passage from the upper heating-vessel to the cans.

Having thus described my invention, I claim as new and desire to secure by Letters Patent—

An apparatus for freeing water from atmospheric air, consisting of an upper heating-vessel having a supply-pipe and interior coil, and of a lower cooling-vessel having one or more coils connected with a bottom opening or openings of the upper vessel, and with a discharge-pipe, all substantially as set forth.

In testimony that I claim the foregoing as my invention I have signed my name, in presence of two witnesses, this 27th day of March, 1880.

OSCAR KROPFF.

Witnesses:
MORITZ WUHRUNG,
FRIEDRICH APEL.